US011290472B2

(12) United States Patent
Ludwig et al.

(10) Patent No.: US 11,290,472 B2
(45) Date of Patent: Mar. 29, 2022

(54) THREAT INTELLIGENCE INFORMATION ACCESS VIA A DNS PROTOCOL

(71) Applicant: International Business Machines Corporation, Armonk, NY (US)

(72) Inventors: Markus Ludwig, Breuna (DE); Volker Vogeley, Bad Sooden-Allendorf (DE); Marc Noske, Lohfelden (DE); Matthias Bartelt, Kassel (DE); Johannes Noll, Kassel (DE); Marc-André Isenberg, Bad Sooden-Allendorf (DE); Uwe Küllmar, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/581,943

(22) Filed: Sep. 25, 2019

(65) Prior Publication Data

US 2021/0092134 A1    Mar. 25, 2021

(51) Int. Cl.
*H04L 61/4511* (2022.01)
*H04L 29/06* (2006.01)

(52) U.S. Cl.
CPC ...... *H04L 63/1416* (2013.01); *H04L 61/1511* (2013.01); *H04L 63/0435* (2013.01); *H04L 63/1425* (2013.01); *H04L 63/1441* (2013.01); *H04L 63/20* (2013.01)

(58) Field of Classification Search
None
See application file for complete search history.

(56) References Cited

U.S. PATENT DOCUMENTS

| 9,467,421 | B2 | 10/2016 | Xie | |
|---|---|---|---|---|
| 10,243,997 | B2 | 3/2019 | Desai | |
| 10,440,059 | B1* | 10/2019 | McCarty | H04L 63/1433 |
| 2006/0195402 | A1* | 8/2006 | Malina | H04L 9/3226 |
| | | | | 705/50 |
| 2011/0283174 | A1* | 11/2011 | M'Raihi | H04L 61/1511 |
| | | | | 715/205 |
| 2011/0283357 | A1* | 11/2011 | Pandrangi | H04L 63/1416 |
| | | | | 726/22 |

(Continued)

*Primary Examiner* — Yogesh Paliwal
*Assistant Examiner* — Hassan Saadoun
(74) *Attorney, Agent, or Firm* — Jeffrey S. LaBaw; David H. Judson

(57) ABSTRACT

A network-accessible cyber-threat security analytics service is configured to receive and respond to requests that originate as name queries to a Domain Name System (DNS) service. Threat intelligence information provided by the service is organized into threat intelligence zones that correspond to zones exposed via the DNS service. Upon receipt of a DNS query, the query having been generated by an application seeking access to threat intelligence data exposed by the service, the query is translated into a DNS zone-specific API request based on the type of threat intelligence information sought. The zone-specific API request is then used to retrieve the requested threat intelligence information from a threat intelligence database. The requested threat intelligence information is then returned to the application by being encoded as part of a response to the DNS query. In this manner, the DNS protocol is leverage to facilitate highly-efficient access and retrieval of threat intelligence information.

22 Claims, 9 Drawing Sheets

(56) References Cited

U.S. PATENT DOCUMENTS

| | | | |
|---|---|---|---|
| 2012/0117641 A1* | 5/2012 | Holloway | H04L 67/28 726/12 |
| 2015/0180892 A1* | 6/2015 | Balderas | H04L 61/1511 726/11 |
| 2018/0069878 A1* | 3/2018 | Martini | H04L 63/164 |
| 2020/0045077 A1* | 2/2020 | Chiba | H04L 63/1466 |

* cited by examiner

THREAT INTELLIGENCE INFORMATION ACCESS VIA A DNS PROTOCOL

BACKGROUND

Technical Field

This disclosure relates generally to cybersecurity information retrieval and use.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, they are typically implemented within an enterprise environment. Recently, cybersecurity products and functions have been implemented in the cloud as a network-accessible service. Thus, it is known to implement a cognitive security analytics platform and threat intelligence service in a network-accessible cloud computing infrastructure to offer cybersecurity applications to a community of users, typically enterprise customers. A service of this type may host various machine learning (ML) and Artificial Intelligence (AI)-based solutions to help users identify threats or risks, and improve the efficacy and efficiency of threat detection and response. Using tools provided by the platform, users can design and deploy customized and comprehensive solutions to address security outcomes, such as SOC Operations workflows, digital trust, or the like. The platform extends the capabilities of enterprise-based security products and, in particular, by providing robust integration capabilities to connect data, applications and tools provided by multiple vendor sources. A representative commercial service of this type is IBM® X-Force Exchange threat intelligence sharing platform.

There are many different types of clients that communicate with a threat intelligence sharing platform and service of this type. These clients include, for example, cloud-based solutions, mobile endpoint security solutions, and even embedded devices (e.g., systems-on-chip devices such as IoT devices, and home-based routers). Currently, clients integrate threat intelligence information provided by network-accessible threat intelligence products and services using RESTful APIs. A RESTful API is an application program interface that uses HTTP requests to GET, PUT, POST and DELETE data. RESTful APIs, however, have certain disadvantages, namely, responses have high latency, the amount of data transferred is more than is requested, communications may need to be explicitly allowed, and proprietary implementations are often required.

There remains a need to provide more efficient techniques to enable access to and use network-accessible cyber-threat security analytics platforms and services.

The techniques of this disclosure address this need in the art.

BRIEF SUMMARY

A network-accessible cyber-threat security analytics platform and/or service is configured to receive and respond to requests that originate as name queries to a Domain Name System (DNS) service. According to this approach, threat intelligence information provided by the platform or service is organized into a set of one or more threat intelligence zones, and typically the zones correspond to zones (or sub-zones) exposed via the DNS service itself. A DNS zone (or sub-zone) is any distinct, contiguous portion of a domain name space in the DNS for which administrative responsibility has been delegated to a particular entity. In this approach, distinct types of threat intelligence information (e.g., risk scores, denied party list checks, IP or website address categorizations, text records, other threat intelligence information returned via lightweight data-interchange formats (JSON), etc.) are associated with distinct DNS sub-zones. Upon receipt of a DNS query, the query having been generated by an application seeking access to the security analytics platform or service, the query is translated into a DNS zone-specific API request based on the type of threat intelligence information sought. The zone-specific API request is then used to retrieve the requested threat intelligence information from a threat intelligence database. The requested threat intelligence information is then returned to the application, preferably by being encoded as part of (or otherwise associated with) a response to the DNS query. In this manner, the DNS protocol is leveraged to facilitate highly-efficient access and retrieval of threat intelligence information.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
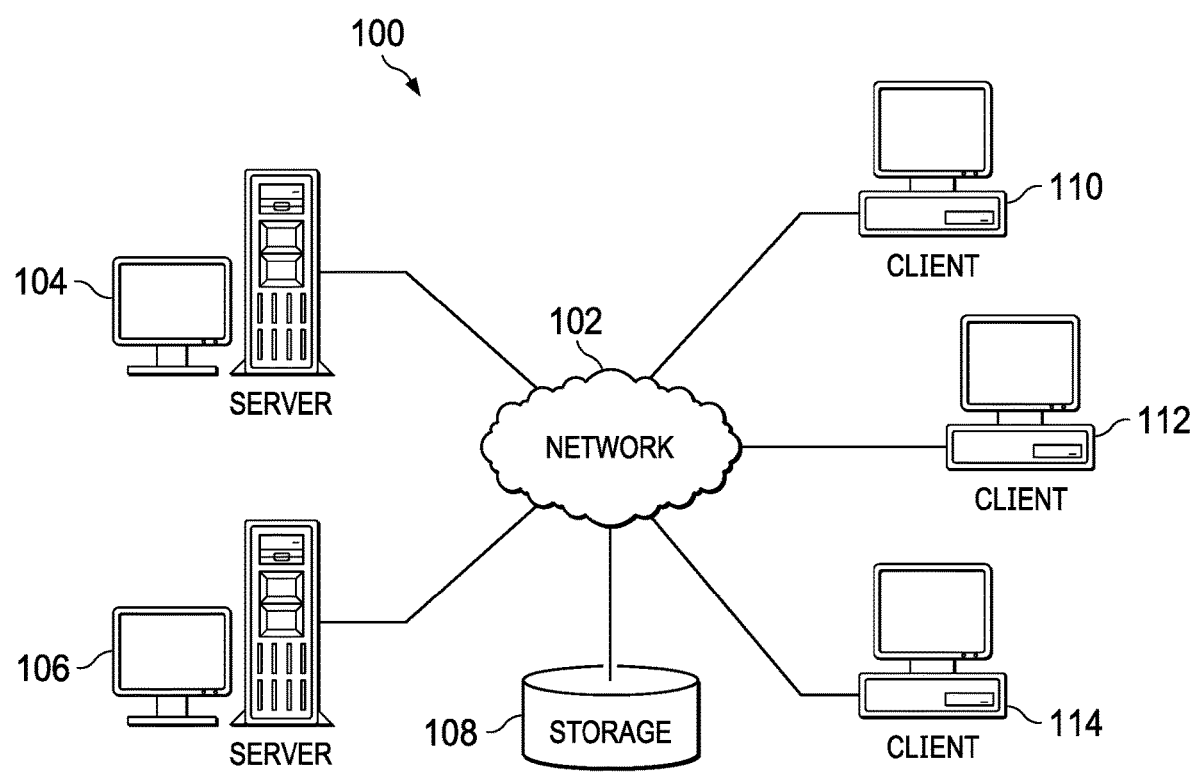
FIG. 1 depicts an exemplary block diagram of a distributed data processing environment in which exemplary aspects of the illustrative embodiments may be implemented.
Figure 2:
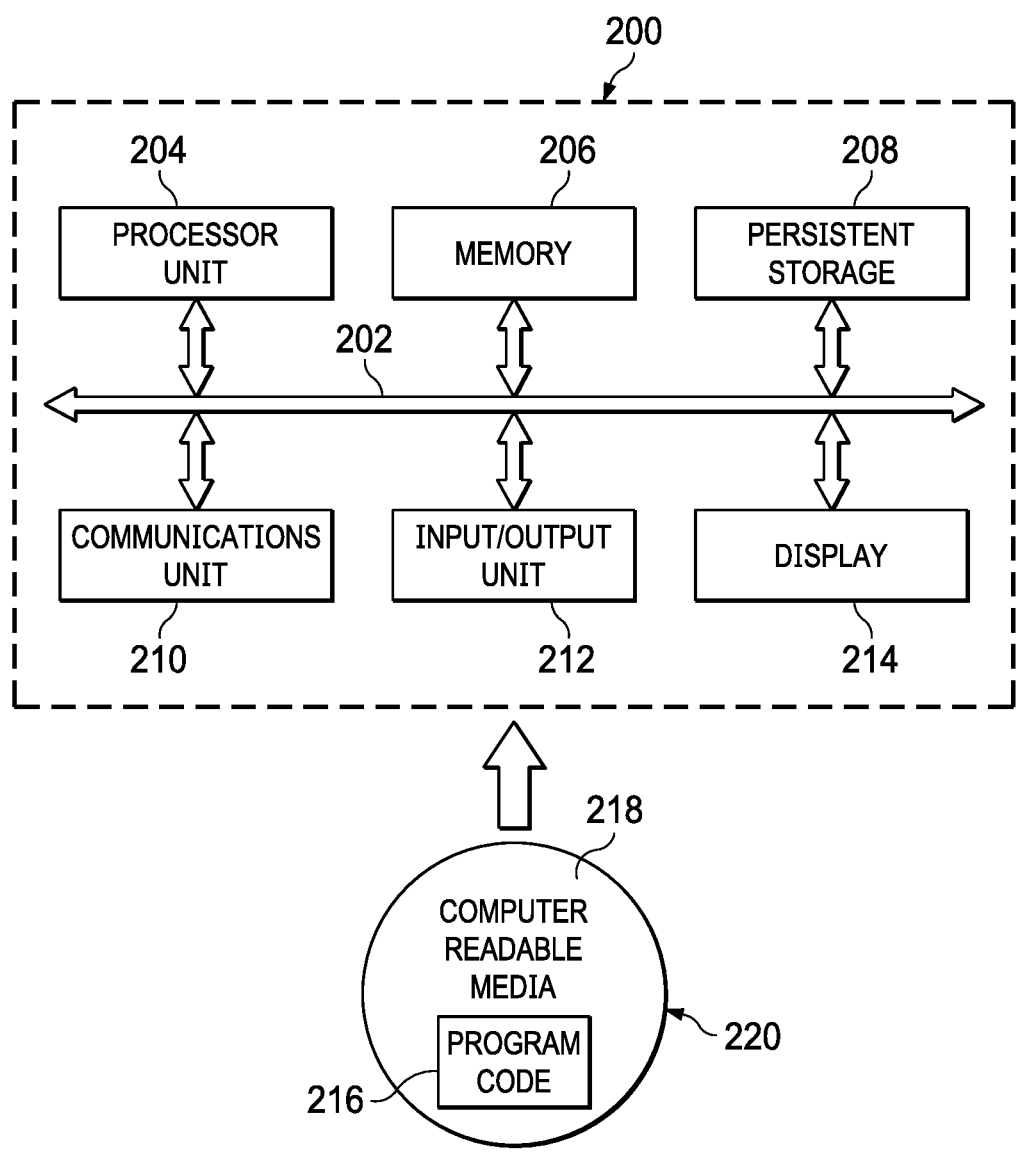
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
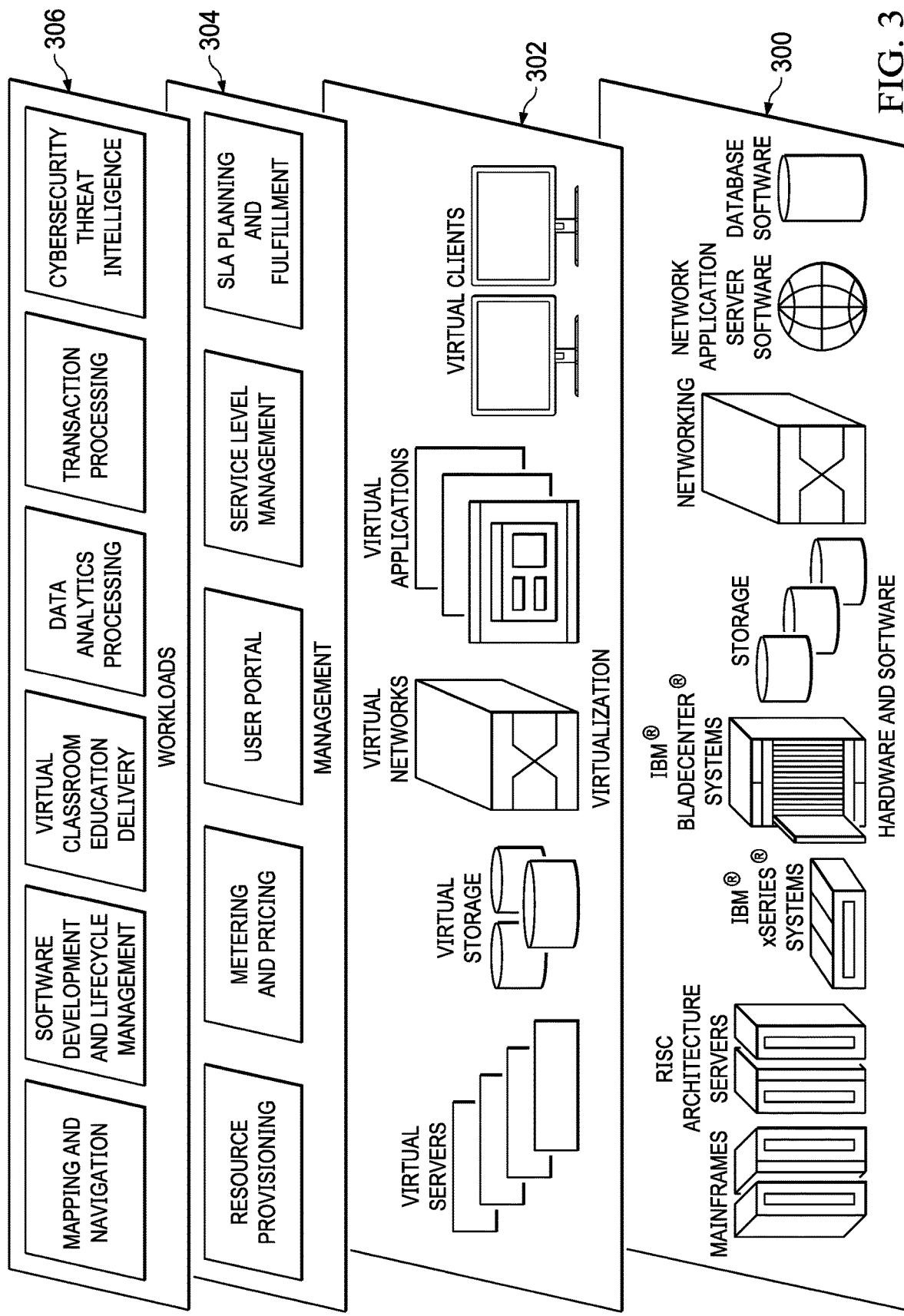
FIG. 3 illustrates a cloud computing infrastructure in which a threat intelligence platform is hosted to provide threat information as-a-service.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing, and, as will be described below, a cognitive security analytics threat intelligence service.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Cyber Threat Intelligence Services

A cognitive security analytics platform and threat intelligence service (TIS) may be implemented in a network-accessible cloud computing infrastructure (e.g., in the Workloads layer depicted in FIG. 3) to offer cyber security applications to a community of users, typically enterprise customers. A service of this type may host various machine learning (ML) and Artificial Intelligence (AI)-based solutions to help users identify threats or risks, and improve the efficacy and efficiency of threat detection and response. Using tools provided by the platform, users can design and deploy customized and comprehensive solutions to address security outcomes, such as SOC Operations workflows, digital trust, or the like. The platform extends the capabilities of enterprise-based security products and, in particular, by providing robust integration capabilities to connect data, applications and tools provided by multiple vendor sources.

A representative commercial service of this type is IBM® X-Force Exchange threat intelligence sharing platform. Among other things, the service enables access to various threat intelligence data sources for threat intelligence information search and retrieval.

Cyber Threat Intelligence Service DNS-Based API

With the above as background, the techniques of this disclosure are now described.

According to this disclosure, a network-accessible cyber-threat security analytics service is configured to receive and respond to requests that originate as queries from a Domain Name System (DNS) service. Threat intelligence information provided by the threat intelligence service (TIS) preferably is organized into threat intelligence zones that correspond to zones exposed via the DNS service. The TIS information retrieval workflow of this disclosure typically is initiated externally to the DNS service itself, e.g., when a client application receives information based on an event, e.g., name information based on a login event, an IP address, a URL, cryptocurrency information, and the like, and, in response, some decision must be made regarding whether the client application (or an end user associated therewith) can take some action, e.g., log into or access a protected resource. The particular nature and scope of this access control decision making is not part of this disclosure, rather, the approach herein is designed to provide an efficient technique for enabling the client application (or, more generally, some access control system or process associated therewith) to access and retrieve threat information intelligence from the TIS efficiently so that the decision can be made. Thus, the technique of this disclosure generally assumes the existence of a front-end decision point, and a back-end threat intelligence service. As will be seen, information retrieval from the TIS is enhanced by leveraging DNS to provide more efficient threat intelligence retrieval for the decision-making.

Figure 4:
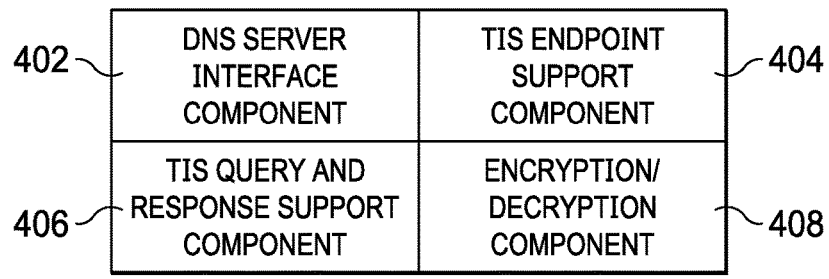
FIG. 4 depicts a set of components comprising a threat intelligence service Application Programming Interface (API) according to this disclosure.

FIG. 4 depicts an information retrieval API that comprises a set of components that facilitate TIS information retrieval in accordance with the technique of this disclosure. In general, these components include a first component 402 that provides a Domain Name System (DNS) server interface, a second component 404 that provides multiple different TIS information endpoints, which are referred to herein as subzones, a third component 406 that queries a TIS database, and a fourth component 408 that encrypts/decrypts client requests and responses, e.g., to comply with privacy and other security requirements. Typically, the components are implemented in software, e.g., as a set of computer program code instructions, which are executed in one or more hardware processors. The components are depicted as distinct, but this is not a requirement. The components may be co-located or executed in different machines. The one or more components (however implemented) enable integration to the TIS in several ways.

In one embodiment, a component is configured to provide a DNS-based interface to accept a request, parse the payload of the request to extract requested information (e.g. a URL, an IP address, a name or the like). The component translates this information into an API request that is sent to the TIS database that contains the required threat intelligence information for this indicator; the response of this database API is parsed and transformed into a conforming DNS answer based on which type of answer is requested. The type of answer preferably is bound to the DNS zone as described below. In an alternative embodiment, a component is used to provide a DNS-based interface to accept requests. The component is used to write any threat intelligence or denied party list information into a DNS zone file where the entries contain information such as the URL, IP address, a name or the like, as part of a DNS host record entry. In this embodiment, the DNS component does a lookup in the zone file, returns matching information, and sends the corresponding information back to a client.

Figure 5:
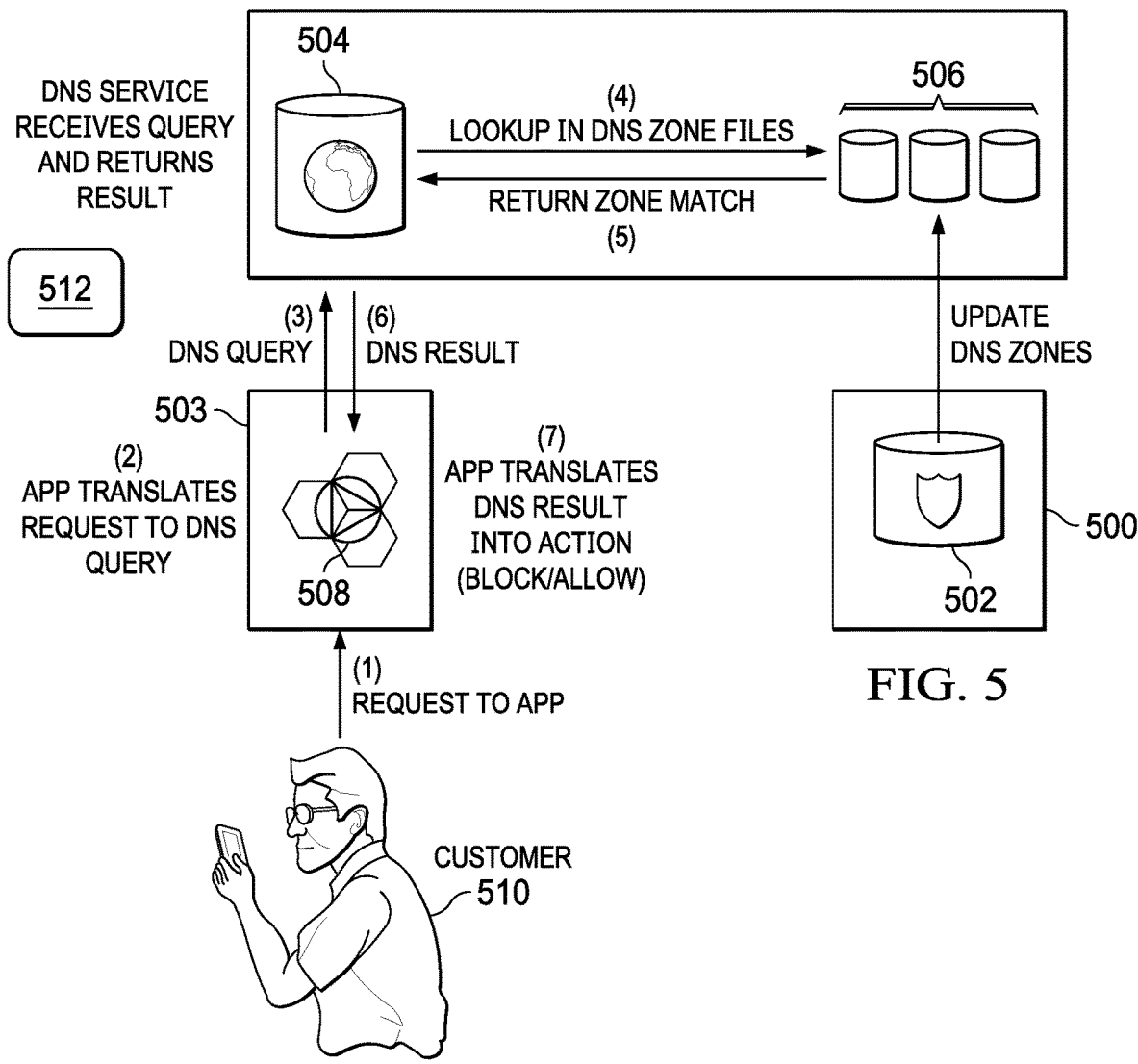
FIG. 5 depict a high level process flow of the technique of this disclosure wherein a DNS protocol is leverages to provide a threat intelligence platform or service API.

FIG. 5 depicts the basic operation of the first embodiment referenced above. As noted above, the technique is designed to work with (or as part of) an existing threat intelligence platform or service (TIS) 500 comprising one or more threat intelligence databases 502. The threat intelligence database 502 stores threat intelligence information of various types, e.g., risk scores, denied party lists, Internet Protocol (IP) address or website address categorizations, text (.txt) records, other threat intelligence information designed to be returned via lightweight data-interchange formats such as JSON, and the like. The TIS 500 is configured to receive and respond to requests for threat information that originate from various sources, e.g., from a decision point 503. A decision point typically is implemented in a computing system, machine, process or program, typically to provide an access control function. As noted above, the nature of the decision point is not an aspect of this disclosure. A representative TIS service that enables information retrieval of this type is IBM® X-Force Exchange threat intelligence sharing platform, although this example is not intended to be limiting. According to this disclosure, information retrieval from the threat intelligence service (e.g., for use by the decision point) leverages a Domain Name System (DNS) service that comprises a DNS server 504 and a set of DNS zone files 506. A representative DNS server executes a name server, e.g., BIND, in a known manner to translate UDP-based DNS queries into responses, such as IP addresses. A typical DNS query is a hostname, and a response to the query includes one or more IP addresses that DNS associates to that hostname. A zone 506 typically includes one or more sub-zones. Generalizing, the notion of a "zone" herein may also refer to a DNS sub-zone.

In this example scenario, an application 508 associated with the decision point 503 receives information based on an event, e.g., name information based on a login event, an IP address, a URL, cryptocurrency information, or the like. The event may originate from an end user 510 interaction, although this is not a requirement, as the event may arise automatically (in response to some other computing activity), programmatically, or otherwise. In this example, and at step (1), the application 508 receives the event (or, more generally, a request) from the end user 510. The application request also may be associated with a request (from the end user) to access a resource 512 of interest (e.g., a site, web page, protected resource, etc.) to the end user. The determination of whether to permit access to the protected resource is then determined by the decision point 503, at least in part by evaluating threat intelligence information returned by the TIS. In particular, a query to the threat intelligence service 500 returns threat intelligence information to enable the decision point to determine whether the end user request (in this example scenario) raises any security concerns. It is this query to the threat intelligence service that is carried out by leveraging the DNS system and in the manner that is now described.

In particular, at step (2) the application 508 translates the event/request into a DNS query, i.e., a query conforming to the DNS protocol (e.g., RFC 1034, 1035, numerous others). This translation may be omitted when the query itself from the end user is itself already formatted as a DNS query. At step (3), the application 508 forwards the DNS query to the DNS server 504. At step (4), the DNS server 504 performs a lookup into the DNS zone files 506 based at least in part on the "type" of threat intelligence information that may be at issue. The particular "type" is not a limitation, and the nature of the end user request, the applicable security policy, the protected resource, etc. all may factor into the determination of the threat information "type" at issue. Thus, for example, there may be various types of TIS information, such as risk scores, denied party lists, IP and URL categorizations, JSON-based threat intelligence, etc. In one embodiment, the DNS zone files 506 receive and store the threat information data from the TIS database 502, or there may be a mechanism to enable access to and retrieval of this information from the TIS database dynamically in response to the query. In step (5), the response to the TIS information lookup is returned to the DNS server. At step (6), the DNS server returns the DNS reply to the decision point 503. At step (7), the client application extracts the threat information and applies decision-making based on the delivered information. The nature of the action (e.g., block/allow a connection to an IP address, to a URL, or login, etc.) is implementation-specific based on the particular decision point access control logic being enforced. This completes the processing in this example scenario.

The one or more components comprising the threat intelligence service API facilitate threat intelligence information retrieval by providing a DNS server interface that receives a request via the DNS protocol, decrypts the payload if required, extracts the information (e.g., IP address, URL, name, etc.) and identifies the relevant subzone, creates a query from the extracted information to the TIS database, receives the requested threat information (e.g., risk score, IP address/URL categorization, denied party list occurrence, other threat intelligence, etc.), translates the response into a conforming DNS reply, encrypts the payload if required, and sends the reply to the client application. The client application decrypts the reply if required, and then applies the decision-making as required.

Figure 6:
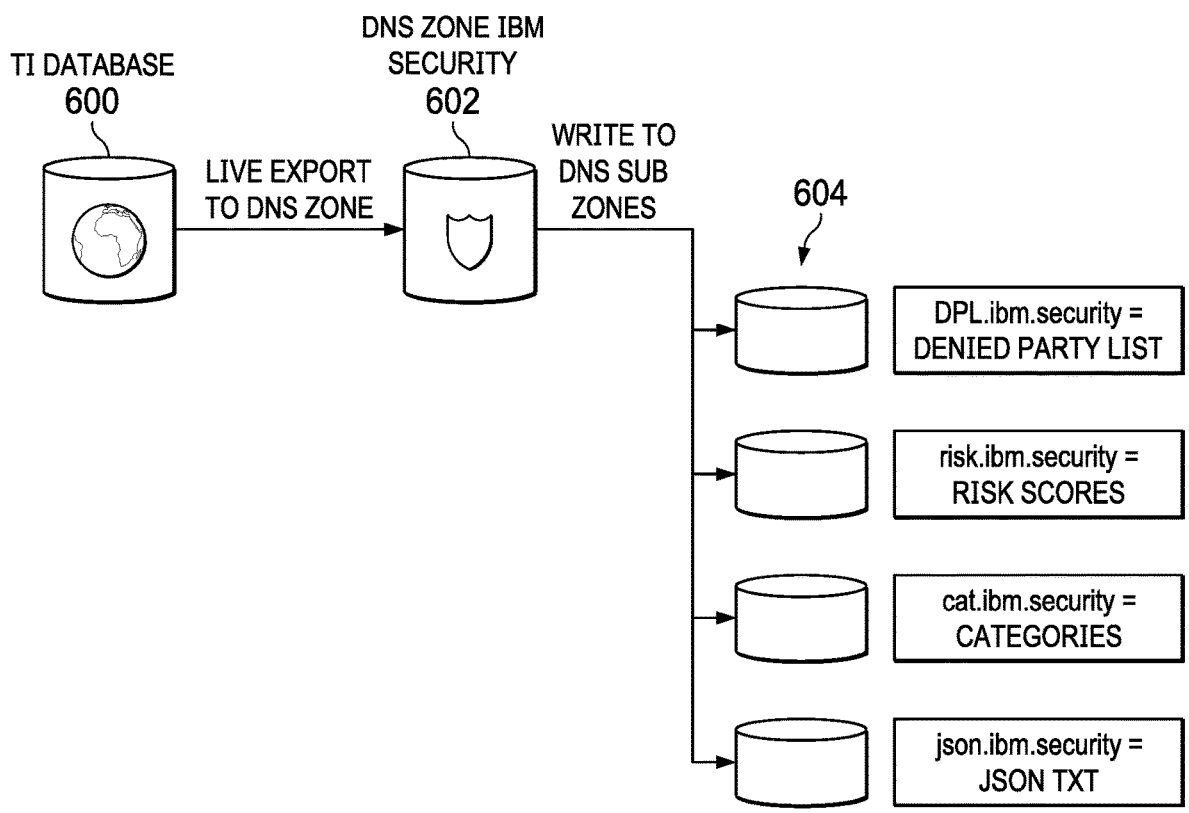
FIG. 6 depicts a set of zone-specific threat intelligence endpoints that are configured to facilitate information retrieval according to this disclosure.

As noted above, the API herein organizes information retrieval to correspond to the different types of threat intelligence data stored in or otherwise accessible from the threat intelligence service. As noted above, in one embodiment, the TIS database exposes/publishes this information (by type) to a component that provide multiple different endpoints. FIG. 6 depicts this operation. In this embodiment, the TIS database 600 exports the data to a DNS zone 602 (called ibm.security). The DNS zone component writes the data by type to the endpoints 604 (in this example: dpl.ibm.security (for denied party list), risk.ibm.security (for risk scores), cat.ibm.security (for IP/URL categories), and json.ibm.security (for JSON .txt). As will be further described, preferably the threat information returned from each of the endpoints is encoded into the DNS reply. The nature of the encoding may vary, typically depending on the type of information. One common type of DNS reply is an IPv4-style (32-bit) IP address grouped into four 8-bit octets. Each of the four octets are separated by a dot, and represented in decimal format. Each bit in an octet has a binary weight. In the approach herein, preferably the TIS information returned from the TIS lookup is encoded in one or more lower order octets of this DNS reply. Although encoding the threat information in the IP address returned from the DNS lookup is preferred, the information can also be returned out-of-band from the response itself (e.g., in a JSON object).

Figure 7:
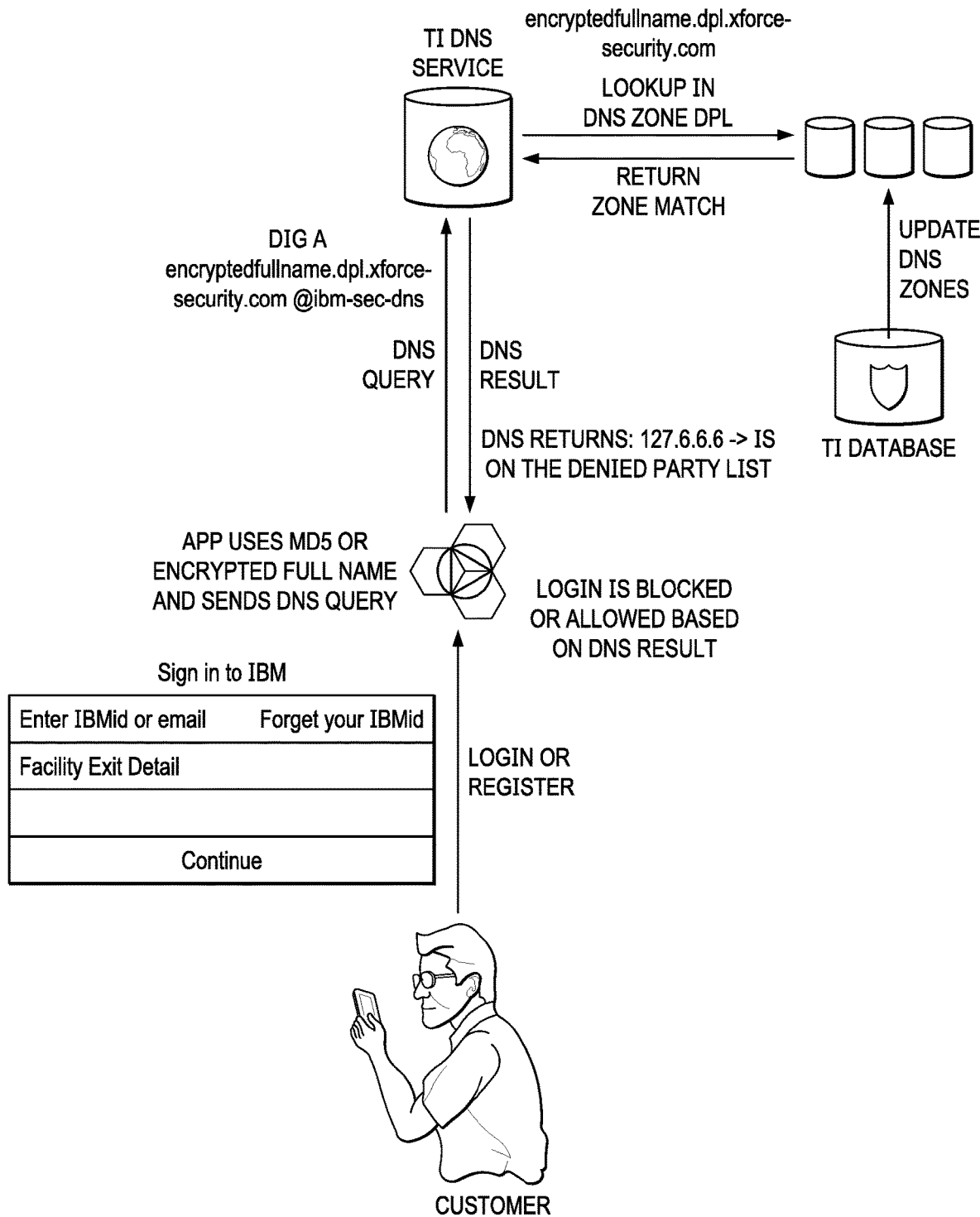
FIG. 7 depicts an example scenario involving a denied party list zone endpoint.

FIG. 7 depicts how the approach is used for denied party list (DPL) resolution. In this example, the lookup is carried out with respect to the DPL zone endpoint. As depicted, in this example, the DNS query returns the IPv4-style address "127.6.6.6." The encoding "***.6.6.6" indicates that the login name is present in the DPL, in which case the application then determines to block the login. If the login name is unknown (not on the DPL), the IP address returned (e.g., "127.0.0.1) does not include any type of encoding, in which case the application then allows the login to proceed.

Figure 8:
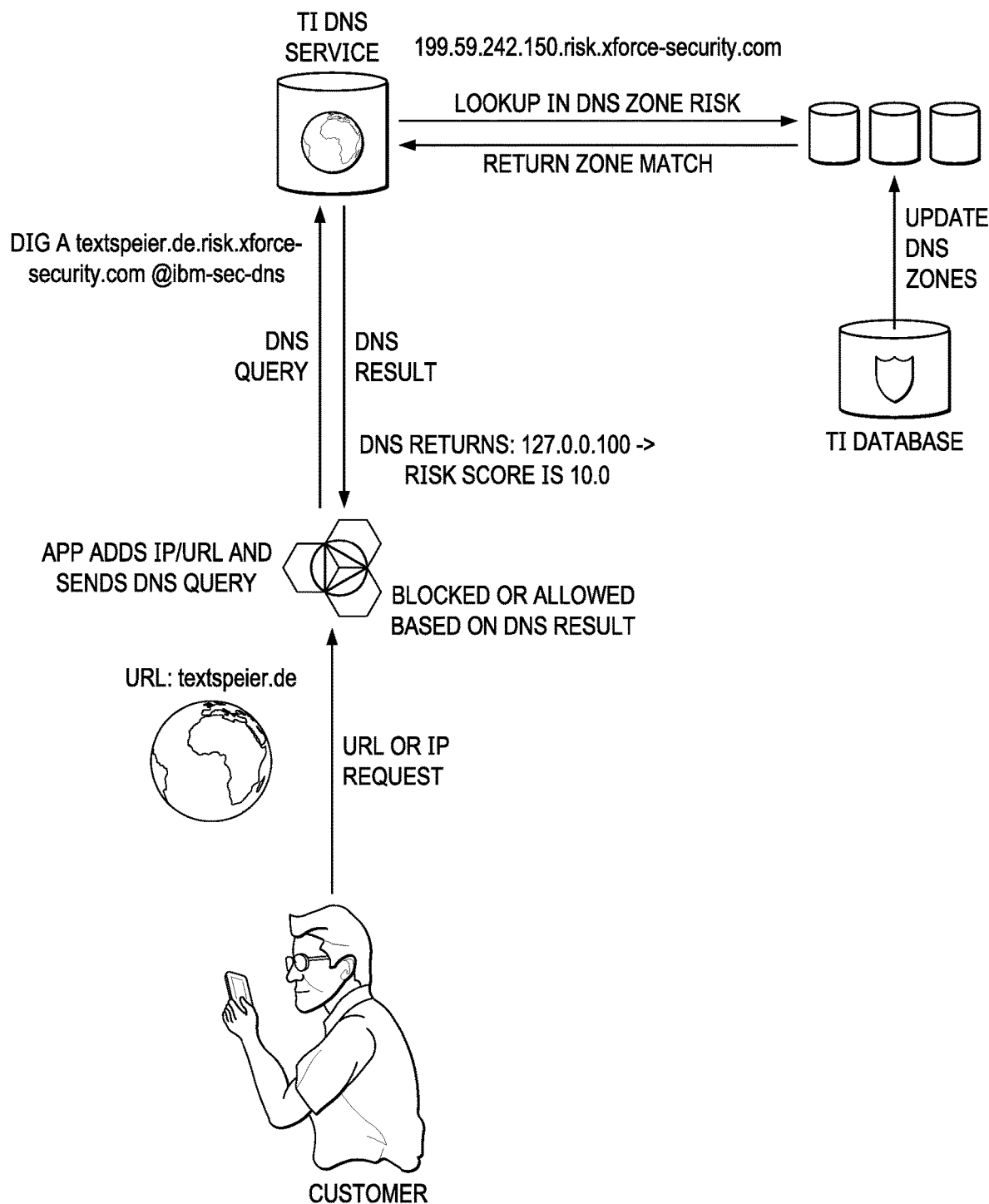
FIG. 8 depicts an example scenario involving a risk score zone endpoint.

FIG. 8 depicts how the approach is used for domain name resolution or IP address lookup with risk scoring. In this example, the lookup is carried out with respect to the risk zone endpoint, and preferably the risk score is encoded in the lowest octet (with a decimal offset). In this example, risk scores range from 0-10. For the domain depicted, the DNS lookup returns "127.0.0.100" indicating a risk score of 10.0. The application would then block the access. Now, assume that the lookup is for an IP address that has a lower risk score, such as 4.3. In this scenario (not depicted), the IP address returned by the lookup is "127.0.0.43," indicating the risk score of 4.3. In either case, the application then applies the relevant decision point logic to determine whether access to the IP address is permitted.

Figure 9:
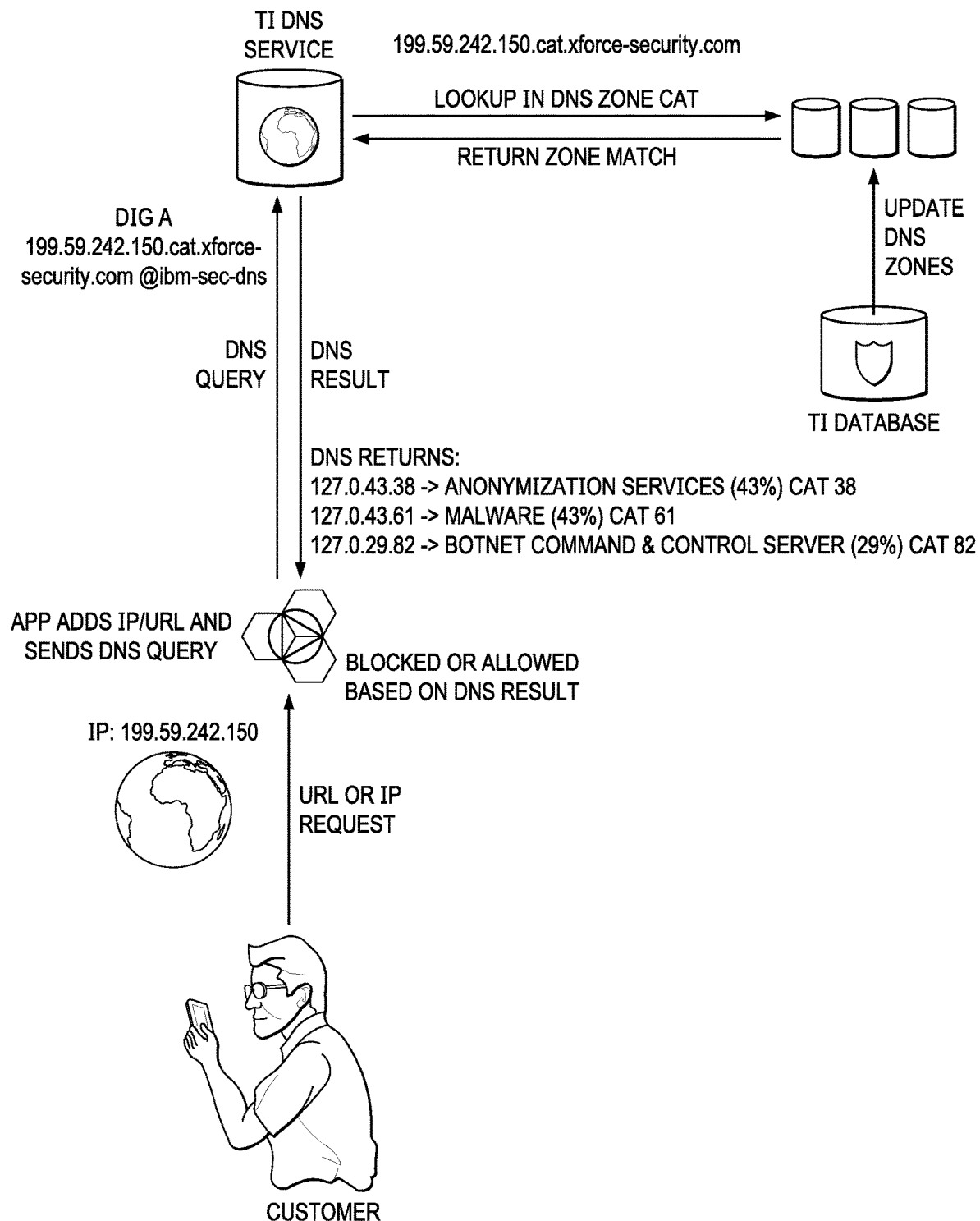
FIG. 9 depicts an example scenario involving a categorization zone endpoint.

FIG. 9 depicts how the approach is used for domain name resolution or IP address lookup with categorization. The process flow in this example scenario is similar to that described above with respect to FIG. 5. In this example, the lookup is carried out with respect to the categorization endpoint (e.g., the endpoint for IP/URL categories depicted in FIG. 6), and preferably the relevant threat information data/scoring identified is encoded in the lower-order octets as depicted, e.g., the value "38" encoded into "127.0.43.38." This information is returned in the DNS result, which is then used by the application to take some action, such as blocking or allowing the request.

Figure 10:
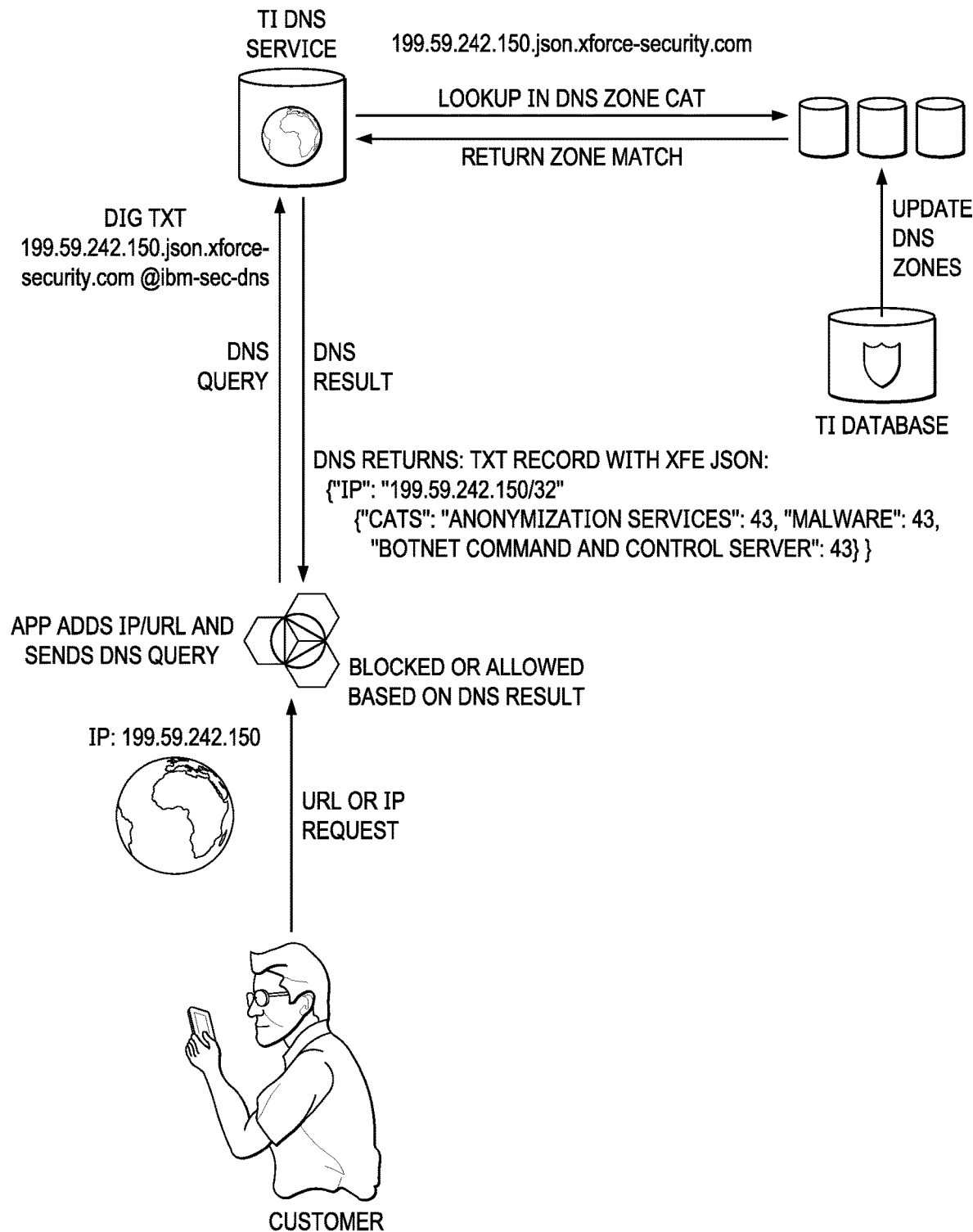
FIG. 10 depicts an example scenario involving a json zone endpoint.

FIG. 10 depicts how the approach is used for domain name resolution or IP address lookup with the threat information being returned using the JSON data exchange mechanism (in the form of a .txt record). The process flow in this example scenario also is similar to that described above with respect to FIG. 5. In this example, the lookup is carried out with respect to the json zone; unlike the earlier scenarios wherein the returned value is encoded into an IP address, in this example the relevant threat data/information is returned separately from or out-of-band (of the IP address) and, in particular, in a .txt data record. This information is then used by the application to take some action, such as blocking or allowing the request.

The threat information returned from the TIS lookup preferably is cached, e.g., globally (by the system), and/or locally at the decision point.

The technique herein provides significant advantages. It significantly reduces the amount of computing resources by optimizing the decision-making process using existing information from a TIS database based on DNS instead of using a local database or a RESTful API, thereby reducing infrastructure costs, operational effort, and network bandwidth. The response latency is low, and only a small amount of data needs to be transferred. No local software installation is required, and the approach leveraging standards-based client and server DNS implementations. The approach provides for efficient and reliable threat information retrieval from a threat information service. Further, because the threat information is striped by type and aligned using DNS zone (or subzones), the approach is readily scaled (e.g., using subzone segmentation and distribution).

The approach described herein is highly performant and fast, as it is based in part on the UDP protocol underlying the DNS protocol. The techniques herein facilitate a DNS-based information system to allow filtering/blocking to resources based on network-accessible threat intelligence, preferably as part of the DNS reply itself. DNS provides real-time communication with very low latency and using very small amounts of traffic, in a simple-to-implement manner. DNS client-server solutions are available in all common programming and scripting languages, and the approach thus is easy to implement in any types of operating environments.

Without intending to be limiting, the approach herein may be used in association with (or as part of) any type of threat information platform or service, however implemented.

This subject matter may be implemented as-a-service. The subject matter may be implemented within or in association with a data center that provides cloud-based computing, data storage or related services.

As noted above, the approach herein is designed to be implemented in an automated manner within or in association with a security system.

Representative clients include, for example, cloud-based solutions, mobile endpoint security solutions, and even embedded devices (e.g., systems-on-chip devices such as IoT devices, and home-based routers).

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat information API functionality as described is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., automation-based cybersecurity analytics platforms, threat intelligence services, threat intelligence information retrieval, decision-making (e.g., access control) systems, and other security systems.

Having described the subject matter, what we claim is as follows:

1. A method to retrieve threat information that is organized according to a set of threat information types, comprising:

associating a set of domain name system (DNS) zones with the threat information types such that a particular DNS zone is associated to a particular threat information type;
receiving a request;
parsing the request to identify given information;
based on the given information, directing a DNS query to a particular one of the set of DNS zones to retrieve threat information;
receiving a response to the DNS query that includes the threat information; and
providing a response to the request.

2. The method as described in claim 1 wherein the threat information is encoded in the response to the request.

3. The method as described in claim 1 wherein the set of threat information types includes one of: a denied party list occurrence, a risk score, an IP address or URL category, and other threat information.

4. The method as described in claim 1 further including:
decrypting the request to expose the given information; and
encrypting the response that includes the threat information.

5. The method as described in claim 1 wherein the given information is one of: an IP address, a URL, a name, and information associated with a resource.

6. The method as described in claim 1 further including writing threat information associated with a particular threat information type to a DNS zone file.

7. The method as described in claim 6 wherein the DNS query is directed to the DNS zone file.

8. An apparatus, comprising:
a processor;
computer memory holding computer program instructions executed by the processor to retrieve threat information that is organized according to a set of threat information types, the computer program instructions including program code configured to:
associate a set of domain name system (DNS) zones with the threat information types such that a particular DNS zone is associated to a particular threat information type;
receive a request;
parse the request to identify given information;
based on the given information, direct a DNS query to a particular one of the set of DNS zones to retrieve threat information;
receive a response to the DNS query that includes the threat information; and
provide a response to the request.

9. The apparatus as described in claim 8 wherein the computer program code is further configured to encode the threat information in the response to the request.

10. The apparatus as described in claim 8 wherein the set of threat information types includes one of: a denied party list occurrence, a risk score, an IP address or URL category, and other threat information.

11. The apparatus as described in claim 8 wherein the computer program code is further configured to:
decrypt the request to expose the given information; and
encrypt the response that includes the threat information.

12. The apparatus as described in claim 8 wherein the given information is one of: an IP address, a URL, a name, and information associated with a resource.

13. The apparatus as described in claim 8 wherein the computer program code is further configured to write threat information associated with a particular threat information type to a DNS zone file.

14. The apparatus as described in claim 13 wherein the DNS query is directed to the DNS zone file.

15. A computer program product in a non-transitory computer readable medium for use in a data processing system to retrieve threat information that is organized according to a set of threat information types, the computer program product holding computer program instructions that, when executed by the data processing system, are configured to:
associate a set of domain name system (DNS) zones with the threat information types such that a particular DNS zone is associated to a particular threat information type;
receive a request;
parse the request to identify given information;
based on the given information, direct a DNS query to a particular one of the set of DNS zones to retrieve threat information;
receive a response to the DNS query that includes the threat information; and
provide a response to the request.

16. The computer program product as described in claim 15 wherein the computer program instructions are further configured to encode the threat information in the response to the request.

17. The computer program product as described in claim 15 wherein the set of threat information types includes one of: a denied party list occurrence, a risk score, an IP address or URL category, and other threat information.

18. The computer program product as described in claim 15 wherein the computer program instructions are further configured to:
decrypt the request to expose the given information; and
encrypt the response that includes the threat information.

19. The computer program product as described in claim 15 wherein the given information is one of: an IP address, a URL, a name, and information associated with a resource.

20. The computer program product as described in claim 15 wherein the computer program instructions are further configured to write threat information associated with a particular threat information type to a DNS zone file.

21. The computer program product as described in claim 20 wherein the DNS query is directed to the DNS zone file.

22. A control system associated with a threat intelligence service that hosts threat information organized according to a set of threat information types, comprising:
a computing element executing an application; and
a computing element executing a threat intelligence service application programming interface (API), the API configured to receive an event associated with the application, parse the event to identify given information, based on the given information direct a zone-specific Domain Name System (DNS) query to a data store of threat information, receive a response to the zone-specific DNS query that includes threat data, and provide a DNS reply to the application that includes the threat data;
wherein a set of DNS zones in the Domain Name System are associated with threat information types such that a particular DNS zone is associated to a particular threat information type;
wherein the application uses the threat data to make an access decision.

* * * * *